US010663346B2

(12) United States Patent
Hegyi

(10) Patent No.: US 10,663,346 B2
(45) Date of Patent: May 26, 2020

(54) METHOD AND APPARATUS FOR TRANSFORMING UNIFORMLY OR NON-UNIFORMLY SAMPLED INTERFEROGRAMS TO PRODUCE SPECTRAL DATA

(71) Applicant: Palo Alto Research Center Incorporated, Palo Alto, CA (US)

(72) Inventor: Alex Hegyi, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 291 days.

(21) Appl. No.: 15/858,338

(22) Filed: Dec. 29, 2017

(65) Prior Publication Data

US 2019/0204153 A1 Jul. 4, 2019

(51) Int. Cl.
| | | |
|---|---|---|
| *G01J 3/45* | (2006.01) | |
| *G01J 3/28* | (2006.01) | |
| *G01J 3/02* | (2006.01) | |
| *G01J 3/453* | (2006.01) | |
| *G01J 3/447* | (2006.01) | |

(52) U.S. Cl.
CPC ............... *G01J 3/45* (2013.01); *G01J 3/0224* (2013.01); *G01J 3/0256* (2013.01); *G01J 3/28* (2013.01); *G01J 3/2803* (2013.01); *G01J 3/2823* (2013.01); *G01J 3/447* (2013.01); *G01J 3/4531* (2013.01); *G01J 3/4537* (2013.01); *G01J 2003/283* (2013.01)

(58) Field of Classification Search
CPC .................................................... G01J 3/45
See application file for complete search history.

(56) References Cited

U.S. PATENT DOCUMENTS

| | | | |
|---|---|---|---|
| 4,342,516 A | 8/1982 | Chamran et al. | |
| 4,461,543 A | 7/1984 | Mcmahon | |
| 4,812,657 A | 3/1989 | Minekane | |
| 4,848,877 A | 7/1989 | Miller | |
| 4,905,169 A | 2/1990 | Buican et al. | |

(Continued)

OTHER PUBLICATIONS

File History for U.S. Appl. No. 14/527,347.

(Continued)

*Primary Examiner* — Raymond L Nimox
(74) *Attorney, Agent, or Firm* — Mueting, Raasch & Gebhardt, P.A.

(57) ABSTRACT

A reconstruction matrix used for calculating a hyperspectral data-cube includes rows of periodic functions. Each row of the reconstruction matrix corresponds to a selected wavelength and each column corresponds to a selected retardance of an interferometer. The periodic functions have as a parameter the selected wavelength of the corresponding row and are sampled at the selected retardances of each of the corresponding columns. An interferogram data-cube is obtained and includes an array of one or more simultaneously measured interferograms. Each row of the interferogram data-cube corresponds to one of the selected retardances and each column corresponds to a different interferogram from the simultaneously measured interferograms. A set of matrix-vector products for each of the interferograms is formed by multiplying the reconstruction matrix with a column of the interferogram data-cube to form the hyperspectral data-cube.

20 Claims, 7 Drawing Sheets

(56) References Cited

U.S. PATENT DOCUMENTS

| | | | |
|---|---|---|---|
| 5,126,869 A | 6/1992 | Lipchak et al. | |
| 5,347,382 A | 9/1994 | Rumbaugh | |
| 5,592,314 A | 1/1997 | Ogasawara et al. | |
| 5,619,266 A | 4/1997 | Tornita et al. | |
| 5,642,214 A | 6/1997 | Ishii | |
| 5,784,162 A | 7/1998 | Cabib et al. | |
| 5,856,842 A | 1/1999 | Tedesco | |
| 5,953,083 A | 9/1999 | Sharp | |
| 6,100,944 A * | 8/2000 | Sharp | G02F 1/21 349/1 |
| 6,169,564 B1 | 1/2001 | Aye et al. | |
| 6,330,097 B1 | 12/2001 | Chen et al. | |
| 6,421,131 B1 | 7/2002 | Miller | |
| 6,552,836 B2 | 4/2003 | Miller | |
| 6,576,886 B1 | 7/2003 | Yao | |
| 6,774,977 B1 | 8/2004 | Walton et al. | |
| 6,992,809 B1 | 1/2006 | Wang et al. | |
| 7,067,795 B1 | 6/2006 | Yan et al. | |
| 7,116,370 B1 | 10/2006 | Huang | |
| 7,167,230 B2 | 1/2007 | Klaus et al. | |
| 7,196,792 B2 | 3/2007 | Drevillon et al. | |
| 7,339,665 B2 | 3/2008 | Imura | |
| 7,630,022 B1 | 12/2009 | Baur et al. | |
| 7,999,933 B2 | 8/2011 | Mcclure | |
| 8,422,119 B1 | 4/2013 | Keaton | |
| 9,631,973 B2 | 4/2017 | Dorschner | |
| 9,864,148 B1 | 1/2018 | Ishikawa | |
| 10,175,116 B1 * | 1/2019 | Hegyi | G01J 9/02 |
| 2002/0181066 A1 | 12/2002 | Miller | |
| 2004/0036876 A1 | 2/2004 | Davis et al. | |
| 2004/0165101 A1 | 8/2004 | Miyanari et al. | |
| 2005/0030533 A1 * | 2/2005 | Treado | G01J 3/02 356/326 |
| 2005/0190329 A1 | 9/2005 | Okumura | |
| 2006/0141466 A1 | 6/2006 | Pinet et al. | |
| 2006/0187974 A1 | 8/2006 | Dantus | |
| 2006/0279732 A1 | 12/2006 | Wang | |
| 2007/0003263 A1 | 1/2007 | Nomura | |
| 2007/0030551 A1 | 2/2007 | Oka et al. | |
| 2007/0070260 A1 | 3/2007 | Wang | |
| 2007/0070354 A1 | 3/2007 | Chao et al. | |
| 2008/0158550 A1 | 7/2008 | Arieli et al. | |
| 2008/0212874 A1 | 9/2008 | Steib | |
| 2008/0266564 A1 | 10/2008 | Themelis | |
| 2008/0278593 A1 | 11/2008 | Cho et al. | |
| 2009/0168137 A1 | 7/2009 | Wen et al. | |
| 2009/0284708 A1 | 11/2009 | Abdulhalim | |
| 2010/0056928 A1 | 3/2010 | Zuzak | |
| 2010/0296039 A1 | 11/2010 | Zhao et al. | |
| 2011/0012014 A1 | 1/2011 | Livne et al. | |
| 2011/0170098 A1 | 7/2011 | Normand | |
| 2011/0205539 A1 | 8/2011 | Cattelan et al. | |
| 2011/0273558 A1 | 11/2011 | Subbiah et al. | |
| 2011/0279744 A1 | 11/2011 | Voigt | |
| 2011/0299089 A1 * | 12/2011 | Wang | G01J 3/4531 356/451 |
| 2012/0013722 A1 | 1/2012 | Wong et al. | |
| 2012/0013922 A1 | 1/2012 | Wong et al. | |
| 2012/0188467 A1 | 7/2012 | Escuti et al. | |
| 2012/0268745 A1 * | 10/2012 | Kudenov | G01J 3/447 356/453 |
| 2012/0300143 A1 | 11/2012 | Voigt | |
| 2013/0010017 A1 | 1/2013 | Kobayashi et al. | |
| 2013/0027516 A1 | 1/2013 | Hart | |
| 2013/0027713 A1 * | 1/2013 | Kudenov | G01J 4/04 356/491 |
| 2013/0107260 A1 | 5/2013 | Nozawa | |
| 2014/0078298 A1 * | 3/2014 | Kudenov | G01J 3/2803 348/135 |
| 2014/0125990 A1 | 5/2014 | Hinderling et al. | |
| 2014/0257113 A1 | 9/2014 | Panasyuk et al. | |
| 2014/0354868 A1 | 12/2014 | Desmarais | |
| 2014/0362331 A1 | 12/2014 | Shi | |
| 2015/0022809 A1 | 1/2015 | Marchant et al. | |
| 2015/0168210 A1 | 6/2015 | Dorschner | |
| 2015/0206912 A1 | 7/2015 | Kanamori | |
| 2016/0123811 A1 | 5/2016 | Hegyi et al. | |
| 2016/0127660 A1 | 5/2016 | Hegyi et al. | |
| 2016/0127661 A1 * | 5/2016 | Hegyi | H04N 5/332 348/164 |
| 2016/0259128 A1 | 9/2016 | Wagener et al. | |
| 2017/0017104 A1 | 1/2017 | Lin et al. | |
| 2017/0264834 A1 | 9/2017 | Hegyi et al. | |
| 2017/0264835 A1 | 9/2017 | Hegyi et al. | |
| 2017/0363472 A1 | 12/2017 | Abdulhaim | |
| 2017/0366763 A1 | 12/2017 | Lin et al. | |
| 2018/0088381 A1 | 3/2018 | Lin et al. | |
| 2018/0095307 A1 | 4/2018 | Herloski | |
| 2019/0121191 A1 | 4/2019 | Hegyi | |

OTHER PUBLICATIONS

File History for U.S. Appl. No. 14/527,378.
File History for U.S. Appl. No. 14/883,404.
File History for U.S. Appl. No. 15/605,625.
File History for U.S. Appl. No. 15/605,642.
File History for U.S. Appl. No. 15/858,354.
File History for EP App. No. 15190915.7 as retrieved from the European Patent Office electronic filing system dated Sep. 25, 2018, 306 pages.
Office action dated Aug. 8, 2018 from CN App. No. 201510710643.X, 16 pages.
U.S. Appl. No. 15/827,204, filed Nov. 30, 2017.
U.S. Appl. No. 15/858,354, filed Dec. 29, 2017.
U.S. Appl. No. 15/858,368, filed Dec. 29, 2017.
U.S. Appl. No. 15/858,609, filed Dec. 29, 2017.
Hegyi et al., "Hyperspectral imaging with a liquid crystal polarization interferometer", Optics Express, vol. 23, No. 22, 13 pages, Oct. 26, 2015.
Itoh et al., "Liquid-crystal imaging Fourier-spectrometer array", Optics Letters, 15:11, 652-652, Jun. 1, 1990.
Jullien et al., "High-resolution hyperspectral imaging with cascaded liquid crystal cells", Optica, Vo. 4, No. 4, pp. 400-405, Apr. 2017.
Li et al., "GPU accelerated parallel FFT processing for Fourier transform hyperspectral imaging", Applied Optics, vol. 54, No. 13, pp. D91-D99, May 1, 2015.
Persons et al., "Automated registration of polarimetric imagery using Fourier transform techniques", Proceedings of SPIE, vol. 4819, 2002.
Porter et al., "Correction of Phase Errors in Fourier Spectroscopy", International Journal of Infrared and Millimeter Waves, vol. 4, No. 2, 273-298, 1983.
Smith et al., "Increased acceptance bandwidths in optical frequency conversion by use of multiple walk-off-compensating nonlinear crystals". J. Opt. Soc. Am. B/ vol. 15, No. 1, Jan. 1998.
Li et al., "GPU accelerated parallel FFT processing for Fourier transform hyperspectral imaging", Applied Optics, vol. 54, No. 13, May 1, 2015, pp. D91-D99.
Porter et al., "Correction of Phase Errors in Fourier Spectroscopy", International Journal of Infrared and Millimeter Waves, vol. 4, No. 2, 1983, 273-298.
EP Patent Application No. 18212124.4; European Search Report dated Jul. 3, 2019; 8 pages.
Kudenov et al., "Compact snapshot birefringent imaging Fourier transform spectrometer", Proceeding of SPIE, vol. 7812, Aug. 12, 2010, p. 781206.
File History for U.S. Appl. No. 15/827,204.
File History for U.S. Appl. No. 15/858,609.

* cited by examiner $$A = \begin{matrix} & \overset{\Gamma_1}{} & \overset{\Gamma_2}{} & & \overset{\Gamma_N}{} \\ \lambda_1 & \cos[\alpha_1(\Phi_1-\phi_1)] & \cos[\alpha_1(\Phi_2-\phi_1)] & \cdots & \cos[\alpha_1(\Phi_N-\phi_1)] \\ \lambda_2 & \cos[\alpha_2(\Phi_1-\phi_2)] & \cos[\alpha_2(\Phi_2-\phi_2)] & \cdots & \cos[\alpha_2(\Phi_N-\phi_2)] \\ \vdots & \vdots & \vdots & & \vdots \\ \lambda_M & \cos[\alpha_M(\Phi_1-\phi_M)] & \cos[\alpha_M(\Phi_2-\phi_M)] & \cdots & \cos[\alpha_M(\Phi_N-\phi_M)] \end{matrix}$$

FIG. 5

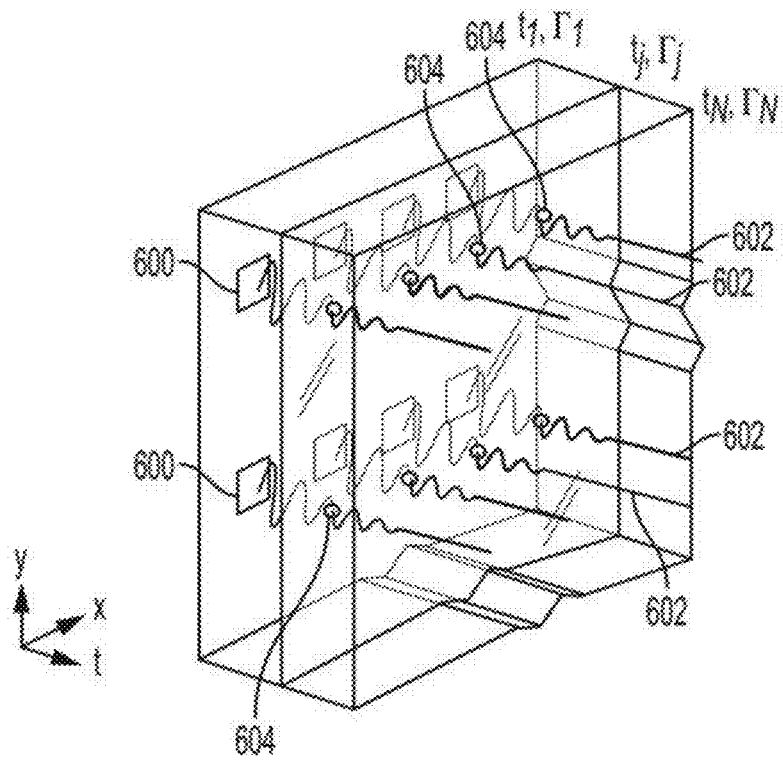

FIG. 6

METHOD AND APPARATUS FOR TRANSFORMING UNIFORMLY OR NON-UNIFORMLY SAMPLED INTERFEROGRAMS TO PRODUCE SPECTRAL DATA

SUMMARY

The present disclosure is directed to a method and apparatus for transforming uniformly or non-uniformly sampled interferograms to produce spectral data at predefined wavelengths. In one embodiment, a set of reference retardances of an interferometer are determined, as are a set of wavelengths corresponding to spectral slices of a hyperspectral data-cube. A reconstruction matrix is formed that includes rows of periodic functions. Each row of the reconstruction matrix corresponds to a selected wavelength of the set of wavelengths, and each column of the reconstruction matrix corresponds to a selected retardance of the reference retardances. The periodic functions have as a parameter the selected wavelength of the corresponding row and are sampled at the selected retardances of each of the corresponding columns. An interferogram data-cube is obtained that includes an array of one or more simultaneously measured interferograms. Each row of the interferogram data-cube corresponds to one of the selected retardances and each column of the interferogram data-cube corresponds to a different interferogram from the simultaneously measured interferograms. A set of matrix-vector products is formed for each of the interferograms. Each of the matrix-vector products includes a matrix multiplication of the reconstruction matrix with a column of the interferogram data-cube. The set of matrix-vector products forms the hyperspectral data-cube.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

FIG. 5 is a diagram of a reconstruction matrix according to an example embodiment;

FIG. 6 is a conceptual diagram of an interferogram data-cube according to an example embodiment;

DETAILED DESCRIPTION

Figure 1:
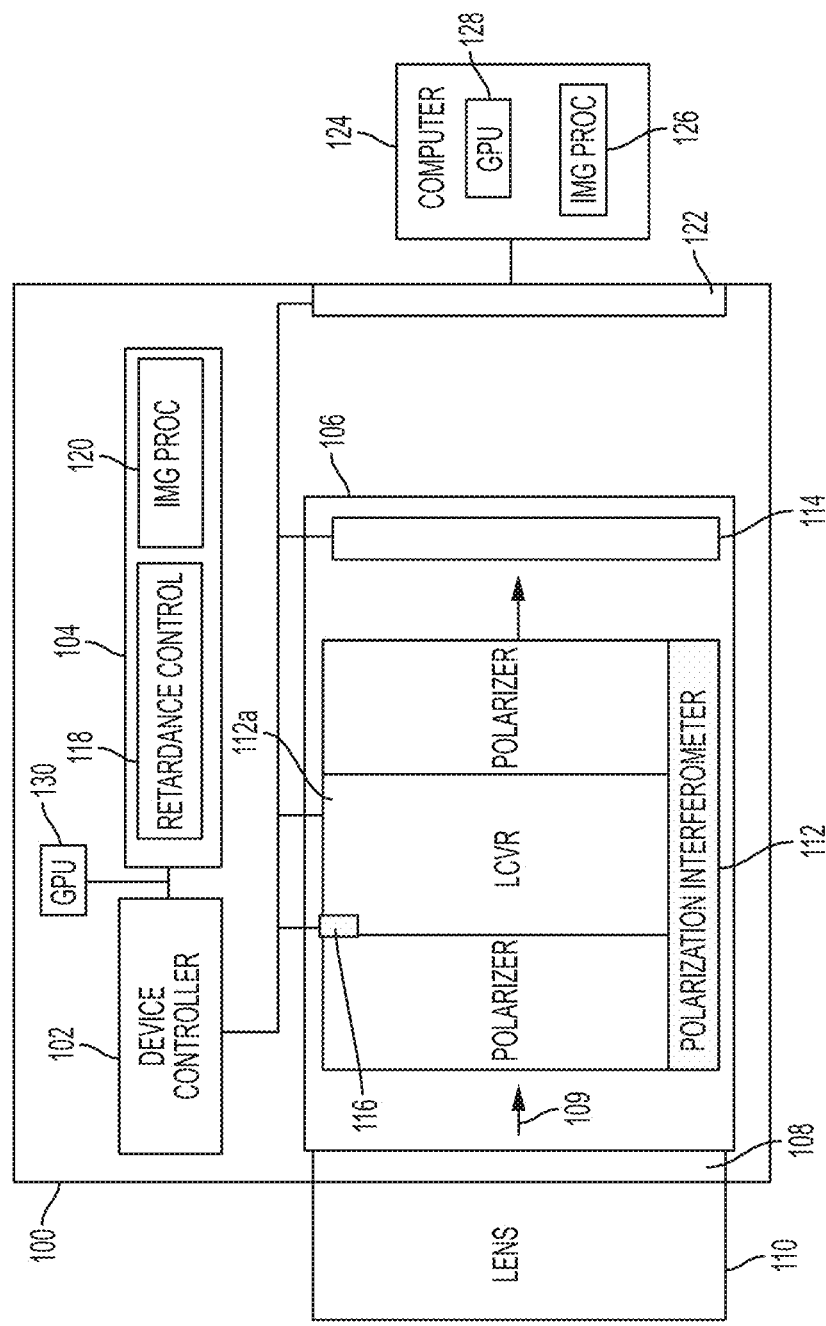
FIG. 1 is a diagram of an apparatus according to an example embodiment.

The present disclosure relates to signal processing in hyperspectral imaging systems. Hyperspectral imaging systems described herein use a polarization interferometer that is configured to introduce a variable optical path delay (or retardance) in components of light that pass through the interferometer. The device that causes the path delay (referred to as a variable optical retarder) is placed between two polarizers such that the variable path delay is introduced between first rays in an incident polarization direction and second rays in an orthogonal polarization (e.g., ordinary and extraordinary rays), with both sets of rays tracing a common path. This path delay causes a wavelength-dependent phase shift between the first and second rays. The path delay causes light exiting the polarization interferometer to form interferograms that are detected via an optical sensor, e.g., a focal-plane array.

A polarization interferometer can use one or more liquid-crystal (LC) cells as a variable optical retarder. Such a variable optical retarder is referred to herein as a liquid-crystal variable retarder (LCVR). Generally, liquid-crystal (LC) materials are liquids having some crystalline properties (e.g., orientation of internal structures, such as the LC director that indicates the local average alignment of LC molecules) that can be selectably altered by applying an external stimulus, such as an electric field or a magnetic field. A change in orientation of the LC director alters the optical properties of the LC materials, e.g., changing the optical axis of the LC birefringence.

An LCVR generates a variable optical path delay, or a variable retardance, between two orthogonal polarizations of light that travel through the liquid crystal. One or more liquid-crystal cells within the LCVR function as electrically tunable birefringent elements. By varying the voltage across the electrodes of the liquid-crystal cell, the cell molecules change their orientation, and it is possible to controllably change the optical path delay over a period of time.

To create a polarization interferometer with an LCVR, the LCVR is placed between a first polarizer and a second polarizer with nominally parallel or perpendicular polarization axes. The slow axis of the LCVR (the polarization axis with the variable optical path delay) is oriented nominally 45 degrees with respect to the polarization direction of the first polarizer. Incoming light is polarized to an incident polarization direction by the first polarizer. Because the slow axis of the LCVR is at 45 degrees with respect to this incident polarization direction, the polarized incident light can be described in terms of a portion of light polarized parallel to the slow axis of the LCVR and a portion of light polarized perpendicular to this axis.

As the light passes through the LCVR, it acquires a wavelength-dependent relative phase shift between the first and second polarizations, thereby leading to a wavelength-dependent change in the polarization state. The second polarizer, or analyzer, oriented either parallel or perpendicular to the first polarizer, interferes the portion of light polarized parallel to the slow axis of the LCVR with the portion of light polarized perpendicular, changing the wavelength-dependent polarization state at the output of the LCVR into a wavelength-dependent intensity pattern that can be sensed by an optical detector or a focal plane array. By sensing this intensity while varying the retardance of the LCVR, it is possible to measure an interferogram of the incoming light, which can be used to ascertain spectral properties of the incoming light.

As noted above, a polarization interferometer is used in hyperspectral imaging applications because of its abilities to encode spectral information of the incident light into an intensity pattern that is easily measured with a non-spectrally-resolving detector. Hyperspectral imaging refers to methods and devices for acquiring hyperspectral datasets or data-cubes, which may include images where densely sampled, finely resolved spectral information is provided at each pixel.

The wavelength-dependent intensity pattern provided by the polarization interferometer corresponds approximately to a cosine transform of the spectrum of the incident light. By recording each pixel's intensity pattern at the output of a polarization interferometer as a function of the LCVR's retardance, the interferograms generated by all points of a scene imaged through the LCVR can be sampled simultaneously. From this, the hyperspectral data-cube can be nominally recovered by applying a transform, such as an inverse cosine transform or Fourier transform along the retardance axis, to the recorded spatially-dependent interferogram.

Hyperspectral imagers based on liquid-crystal polarization interferometers generate interferograms that may be non-uniformly sampled with respect to optical path delay. A standard Fourier transform may not be optimal for converting the raw data generated by such a device to a hyperspectral image. This disclosure describes methods and apparatuses used to reconstruct the hyperspectral data-cube with better accuracy and fewer artifacts than with a Fourier transform, whether or not the interferograms are uniformly sampled.

To enhance understanding of hyperspectral image processing described herein, a block diagram in FIG. 1 illustrates an apparatus 100 that performs image processing according to an example embodiment. The apparatus 100 includes a device controller 102, which may include one or more processors, such as central processing units, subprocessors, graphics processing units, digital signal processors, etc. The controller 102 is coupled to a memory 104 that includes functional modules that will be described in greater detail below. The memory 104 may include a combination of volatile and non-volatile memory, and may store instructions and data as known in the art.

The apparatus 100 includes an optical section 106 with an external optical interface 108 that receives light from outside the apparatus 100. The external optical interface 108 may include windows, lenses, filters, apertures, etc., suitable for passing light 109 from outside the apparatus 100 to internal optical components. In this example, the external optical interface 108 is shown coupled to an external lens 110.

A polarization interferometer 112 is located in the optical section 106 of the apparatus 100. The polarization interferometer 112 is coupled to the controller 102, e.g., via electrical signal lines. The controller 102 applies signals to the polarization interferometer 112 to cause a time-varying optical path delay or retardance in an LCVR 112a that is part of the interferometer 112. This time-varying optical path delay causes a wavelength-dependent phase shift between different polarizations of the light 109, resulting in interferograms that vary as a function of the optical path delay. The interferograms are detected by an image sensor 114 (e.g., an array of sensor pixels, focal plane array) which is also coupled to the controller 102.

A retardance controller 118 instructs the device controller 102 to apply a control signal to the LCVR 112a to achieve a time-varying retardance trajectory. An image processor 120 uses this retardance trajectory as a measure of time-varying path delay together with interferograms detected at the image sensor 114. Each detected interferogram can be processed by calculating a transform as a function of the path delay at a corresponding position of the LCVR 112a, and together the processed interferograms comprise spatially-dependent spectral data, e.g., a hyperspectral data-cube.

All the processing described herein can take place within the apparatus 100 or via external computer 124 coupled by interface 122 or some combination thereof. This is indicated by image processor 126 operating on computer 124. The computer 124 and/or the apparatus 100 may include a graphics processing unit (GPU) 128, 130 that can be used to speed up certain computations as described below. Generally, a GPU 128, 130 will have a large number of processing cores (e.g., hundreds or thousands) configured for parallelizable sub-computations, such as matrix or sub-matrix multiplications. Assuming each of the sub-computations are independent, a GPU can greatly reduce image processing time. As the calculations below involve parallelizable matrix multiplication, a GPU may be used to improve processing speeds.

Hyperspectral imagers described herein generate raw signals that are interferograms with respect to optical path delay independently at each pixel. When these systems are based on liquid-crystal polarization interferometers, the sampling of the interferograms may not be entirely uniform with respect to optical path delay. As a result, typical Fast Fourier Transform (FFT) algorithms may not work to calculate hyperspectral data-cubes from the interferograms. Furthermore, even if the interferogram sampling were uniform, an FFT of the interferograms may not lead to an optimal estimate of spectral data, e.g., the hyperspectral data-cube. Non-uniform sampling may be intentionally introduced, for example through denser sampling at shorter path delays, in order to enhance the sensitivity at certain wavelengths.

One way that non-uniform sampling might be remedied prior to applying an FFT to an interferogram is to resample the interferogram at uniform intervals of optical path delay or retardance via interpolation. One can assume that the optical path delay of each recorded interferogram sample is known, for example by obtaining the phase of an interferogram of a monochromatic reference light source of known wavelength as a function of time. If the optical path delay were changed monotonically as a function of time as is generally the case, there would be a one-to-one relationship between optical path delay and time. Individual interferogram samples would be taken at known retardances, and a uniformly spaced retardance grid could be used to calculate, via interpolation of the interferogram samples, the interpolated interferograms.

However, this interpolation method may be computationally expensive, especially if higher-order (e.g., cubic spline) methods are used or image sizes are large. Also, in regions of the interferogram that may be sampled near the Nyquist limit or that may have few samples per interference fringe (especially for shorter wavelengths near zero path delay), the interpolation may cause significant loss and/or distortion of the signal, which would be disadvantageous and potentially cause artifacts in the reconstructed spectral data. The hyperspectral imagers described herein may already be less sensitive to shorter wavelengths, and such an interpolation just exacerbates this problem.

Figure 2:
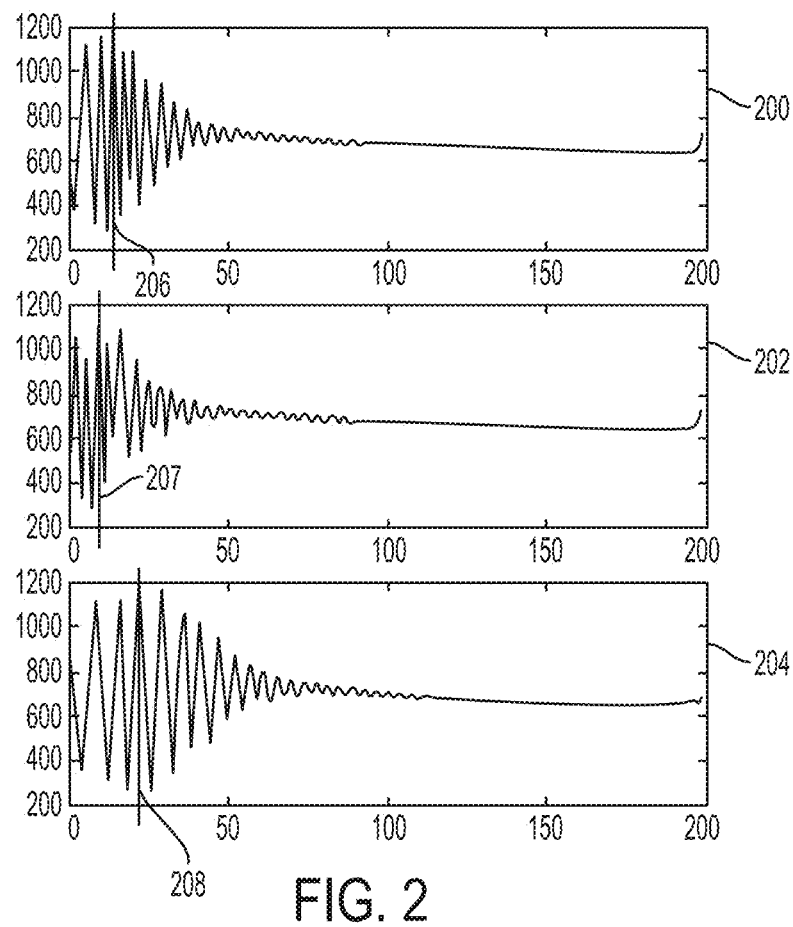
FIG. 2 is a set of plots showing interferograms processed via an optical device according to example embodiments.
Figure 3:
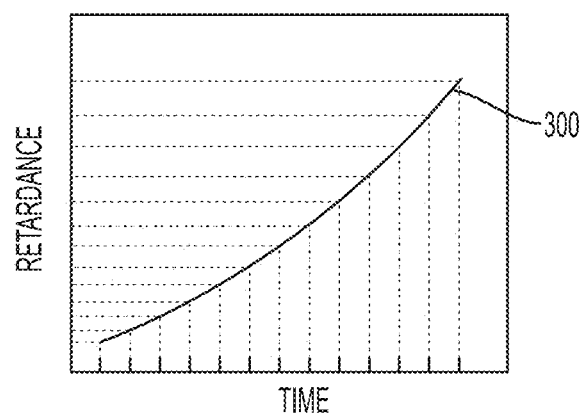
FIG. 3 is a graph of retardance versus time for an optical device according to an example embodiment.

In FIG. 2, a set of plots show how different sampling methods can affect the signal strength and distortion of an interferogram according to an example embodiment. The top plot 200 is an interferogram of a blue LED measured through a polarization interferometer based on an LCVR. The interferogram was sampled at uniformly spaced time intervals while the retardance of the LCVR was scanned at a nominally constant rate. However, due to small fluctuations in the scanning rate of the LCVR, the interferogram in the top plot 200 was sampled at non-uniform intervals of retardance. The middle plot 202 shows the results of resampling, via interpolation, of the interferogram in the top plot 200 at uniform retardance increments. This interpolation decreases the interferogram signal strength (as measured by the interferogram's standard deviation) by almost 20%. Plot 204 shows a separately measured interferogram of the same blue LED that was purposely sampled non-uniformly with respect to retardance (although at uniformly-spaced time intervals, as shown in FIG. 3) to increase the number of samples near zero path delays 206-208 which is where, as can be seen in plots 200, 202, 204, most of the signal from short (blue) wavelengths is located. In this example, the intentional non-uniform sampling of the interferogram in 204 boosted the standard deviation of the signal with respect to the interferogram in 200 by about 30%. In general, contributions from wavelengths across the detectable optical spectrum (e.g., 400 nm-1000 nm for CMOS detectors) will be present in measured interferograms. The intentional non-uniform retardance sampling described above can have the effect of increasing the signal strength at shorter wavelengths with respect to longer wavelengths, which is often desirable to maintain dynamic range across the detectable optical spectrum.

The non-uniform retardance sampling can also be dealt with via a number of methods developed for Fourier transforms of non-uniformly sampled data, such as the non-uniform discrete Fourier transform, which can be calculated with the NuFFT software library. However, a Fourier transform across all frequencies may be overkill, as many of the calculated frequencies may not even correspond to wavelengths within the detectable optical spectrum. Instead, the image processor 120 can approximate a Fourier transform by taking a dot-product of the interferogram with only the (uniformly or non-uniformly sampled) Fourier components of interest, or equivalently, only those rows of the (regular or non-uniform) discrete Fourier transform (DFT) matrix that contribute to wavelengths of interest.

An advantage of this method is that each wavelength can be treated independently to incorporate different apodizations and wavelength-dependent zero path delay, and the Fourier components can be sampled with the same non-uniformity as the interferogram such that the non-uniformity is no longer an issue. Any additional linear transformations can also be combined with this matrix to form an overall "reconstruction" matrix for directly reconstructing spectral data from the raw interferograms. Such a matrix could even have a spatial index to incorporate spatial calibrations such as a spatially-dependent retardance.

To generate the reconstruction matrix, a reference retardance vs. time curve is obtained from a sensor, as shown in by the example curve 300 in FIG. 3. For example, a monochromatic light source 116 (see FIG. 1) located on one side of a liquid-crystal cell may be used to obtain this curve 300. The light from the light source 116 is detected by the sensor 114 while the controller 102 applies a voltage to the LC cell(s) of the LCVR 112a, causing the retardance of the LCVR to transition from a first to a second retardance. The controller 102 then analyzes the detected oscillations in intensity of the light source 116 to determine the time-dependent retardance, or equivalently, the phase of the interferogram of the light source 116 for each sample of the interferogram. Other ways of obtaining the data of plot 300 comprise analyzing a capacitance measurement of the LC cell(s) using a similar procedure.

The system may have wavelength- and temperature-dependent variations in zero path delay which may arise, for example, by compensating a residual liquid-crystal retardance with another birefringent material. It is desirable that interferograms are measured at both positive and negative path delays, and in some cases, the residual liquid-crystal retardance prevents this and must be compensated. One way to compensate the residual retardance is to include within the polarization interferometer a fixed retardance of opposite sign, e.g., a multiple-order waveplate with slow axis perpendicular to the slow axis of the LCVR. If this compensating waveplate has a retardance that depends on wavelength and/or temperature in a manner different than the retardance of the LCVR, the zero path delay of the polarization interferometer would depend on both wavelength and temperature. In such a case, the system can also determine and store a zero path delay point, with respect to the reference retardance curve, for each wavelength and thus each row of the reconstruction matrix. An example of determining zero path delay according to an example embodiment is shown in a set of plots in FIG. 4.

Figure 4:
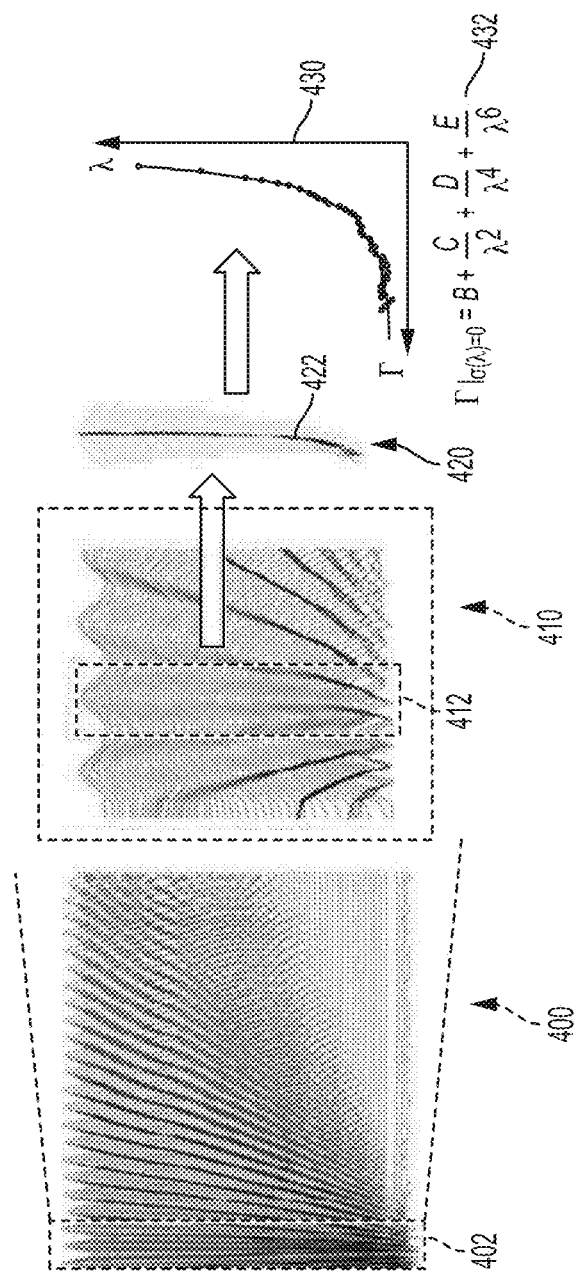
FIG. 4 is a set of plots showing the measurement of a wavelength dependence of a zero path delay of an interferometer according to an example embodiment.

In FIG. 4, plot 400 is a set of measurements of interferograms of a narrowband light source stepped in 10 nm increments, each shown stacked upon the other. Wavelength increases up the vertical axis. Plot 410 is an expanded view of the portion 402 of plot 400, and plot 420 is a subset of the portion 412 of plot 410. The highlighted points 422 in plot 420 indicate the reference retardance value that represents the actual zero path delay for each wavelength, $\sigma(\lambda)=0$, where $\sigma$ is the actual interferometer path delay and not the measured reference retardance. These points 422 form a curve and not a vertical line because some of the liquid-crystal retardance is compensated with a waveplate of different dispersion, thus resulting in a residual dispersion across the detectable optical spectrum.

This residual dispersion is related to a sum of indices of refraction of both the liquid-crystal material and the compensation waveplate. As indicated by plot 430 and equation 432, a Cauchy approximation (e.g., up to 6th order) can be used to fit the data. Note that the coefficients of the equation generally depend on temperature. Using equation 432, the reference retardance corresponding to zero path delay can be calculated at any wavelength where the Cauchy approximation is valid. This equation can also be solved for different temperatures, assuming the coefficient variation with respect to temperature has been characterized. The coefficients can be stored in memory of the apparatus 100 as known in the art and used by the image processor in the computations described below.

Another parameter that can be used by the image processor 120 is the rate of change of phase delay of a given wavelength of interest (e.g., $\lambda_i$, corresponding to the $i^{th}$ row of the reconstruction matrix) relative to the rate of change of phase of the reference retardance curve at a reference wavelength $\lambda_0$. A scaling factor can be obtained, for example, by knowledge of the liquid crystal indices of refraction $n_e$, $n_0$ as a function of wavelength $\lambda$ and temperature T, where the e- and o-subscripts represent the respective indices for the extraordinary and ordinary rays. Equation (1)

below can be used to determine the scaling factor $\alpha_i$, at wavelength $\lambda_i$, or a calibration can be used to empirically determine a value.

$$\alpha_i = \frac{n_e(\lambda_i, T) - n_o(\lambda_i, T)}{n_e(\lambda_0, T) - n_o(\lambda_0, T)} \left(\frac{\lambda_0}{\lambda_i}\right) \quad (1)$$

In view of the above, the elements $A_{ij}$ of the reconstruction matrix may then be represented as shown in Equation (2) below, where $\Phi_j$ is the phase of the reference retardance curve corresponding to interferogram sample j. The phase $\Phi_j$ is found empirically by analyzing the interferogram of a reference light source, e.g., using Takeda's method; it relates to the reference retardance $\Gamma_j$ as $\Phi_j = 2\pi\Gamma^j/\lambda_0$ The angle $\phi_i$ is the phase of the reference retardance curve corresponding to zero path delay for wavelength $\lambda_i$, calculated e.g. as in Equation (3) via the fitting coefficients obtained in FIG. 4. Subtracting the phase $\phi_i$ from the phase of the reference retardance curve $\Phi_j$ phase shifts the periodic function sampled in row i such that it has a phase of 0 at an interferogram sample corresponding to the zero-retardance point of the interferometer at wavelength $\lambda_i$.

$$A_{ij} = \cos(\alpha_i(\Phi_j - \phi_i)); \quad i \in \{1 \ldots M\}, \quad j \in \{1 \ldots N\} \quad (2)$$

$$\phi_i = 2\pi\left(B + \frac{C}{\lambda_i^2} + \frac{D}{\lambda_i^4} + \frac{E}{\lambda_i^6}\right)/\lambda_0 \quad (3)$$

Note the reconstruction matrix elements in Equation (2) only need to be calculated once per image acquisition, as each acquisition has a specific reference retardance curve and temperature. In FIG. 5, a diagram shows a reconstruction matrix 500 according to an example embodiment. The matrix 500 includes rows of periodic functions 502 (e.g., cosine functions) as in Equation (2). Each row corresponds to a selected wavelength of a set of wavelengths 504, which each correspond to spectral slices of a hyperspectral data-cube. The wavelengths 504 can be preselected to have a particular range and distribution. Note that the previously described reference wavelength $\lambda_0$ may or may not be included in the set of wavelengths 504.

Each column of the matrix 500 corresponds to a selected retardance of a set of reference retardances 506. The set of reference retardances 506 are associated with a state of an interferometer at a particular point in time. Note that the set of retardances 506 may be distributed at non-uniform retardance intervals (e.g., as shown in FIG. 3), and the initial retardance $\Gamma_1$ may or may not be a minimal retardance.

The periodic functions 502 have as a parameter the selected wavelengths 504 (or the indices of the selected wavelengths 504) of the corresponding row and are sampled at the reference retardances 506 of each of the corresponding columns. The matrix 500 can be multiplied with an interferogram data-cube to obtain spectral data. In FIG. 6, a conceptual diagram shows an interferogram data-cube according to an example embodiment. Elements 600 represent individual sensors of a detector, e.g., pixels of a focal plane array, arranged across an xy-plane. The t-axis represents a change in retardance of a polarization interferometer from $\Gamma_1$ to $\Gamma_N$, which each correspond to a different point in time between $t_1$ and $t_N$ during which the data-cube is acquired. The curves 602 represent individual interferograms measured at each sensor 600 over the acquisition time period. Therefore, the interferogram data-cube is formed of an array with each element having a sample value corresponding to a particular sensor position and retardance value. Points 604 represent individual samples corresponding to retardance $\Gamma_j$ for the sensors 600.

Figure 7:
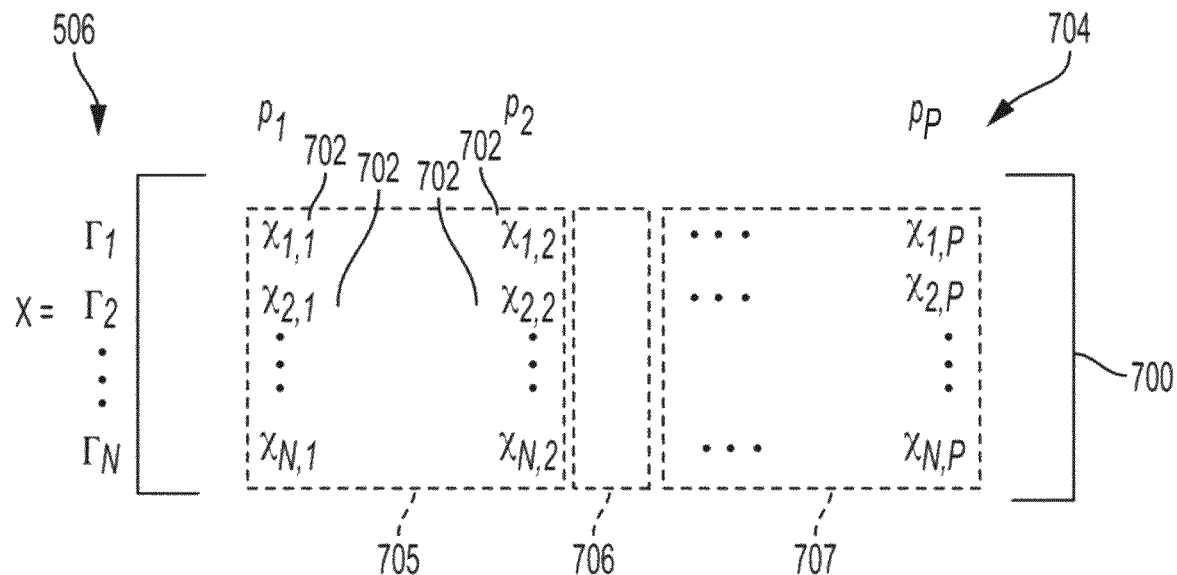
FIG. 7 is a diagram of a matrix that represents an interferogram data-cube according to an example embodiment.

While the illustrated sensors 600 are in a two-dimensional spatial arrangement, for purposes of calculation they can be labeled by a single index, e.g., $p_k$, $k \in \{1 \ldots P\}$. As such, the interferogram data-cube can be represented as a two-dimensional matrix X 700 as shown in FIG. 7. The matrix 700 includes samples 702 that correspond to simultaneously measured interferograms. Each row of the matrix 700 corresponds to a selected retardance of the reference retardances 506 and each column corresponds to a different interferogram measurement from the set of simultaneously measured interferograms with index k. As shown here, the interferogram samples are labeled by sensor positions 704, the sensor array having P positions, e.g., P=number of pixel rows* number of pixel columns.

The calculation of spectral data or the hyperspectral data-cube involves forming a set of matrix-vector products for each of the interferograms, each of the matrix-vector products comprising a matrix multiplication of the matrix 500 with a column k of the interferogram data-cube 700. Thus, the resulting hyperspectral data-cube H can be formed by the matrix multiplication H=AX. Each row of H can be composed into an image corresponding to one of the wavelengths 504, each pixel of the image corresponding to an intensity at the corresponding wavelength and at the spatial location labeled with index k.

In some embodiments, different reconstruction matrices 500 can be constructed for at least two spatial regions of the interferometer. Thus, different pixel locations $p_k$ in FIG. 7 can be multiplied by a different reconstruction matrix. This is indicated in FIG. 7 by regions 705-707, which may each be associated with a different reconstruction matrix 500. Such regions may encompass one or more individual pixels and may also encompass non-contiguous portions of the data-cube matrix 700. In this way, compensation for spatially-dependent characteristics of the polarization interferometer (or other optical components) can be made at any desired granularity.

The reconstruction of spectral data from interferograms that are asymmetric with respect to zero path delay requires special handling to prevent the formation of low-resolution spectral artifacts (see, e.g., C. D. Porter and D. B. Tanner, "Correction of phase errors in Fourier spectroscopy," Int. J. Infrared Millimeter Waves 4, 273-298 (1983)). One way to incorporate this special handling into the reconstruction matrix 500 is to multiply each row of the matrix 500 with a linear "ramp" function that starts equal to zero at the end nearest zero path delay, goes through one half at the (wavelength-dependent) zero path delay point, and continues to one with the same slope, at which point it remains constant. Without loss of generality, it can be assumed that the phase of the reference retardance curve starts at a minimum of 0 for $\Phi_{j,j=1}$ and increases monotonically for increasing sample number j. Then, the wavelength-dependent ramp can be defined as in Equation (4) below. Equation (4) defines a matrix that can be multiplied elementwise with the reconstruction matrix to accommodate asymmetric interferograms.

$$r_{ij} = \begin{cases} \frac{\Phi_j}{2\phi_i}, & \Phi_j < 2\phi_i \\ 1, & \Phi_j \geq 2\phi_i \end{cases} ; \quad i \in \{1 \ldots M\}, \quad j \in \{1 \ldots N\} \quad (4)$$

The rows of the reconstruction matrix 500 can also be multiplied by a windowing or apodization function as long as it is symmetric about zero path delay for each wavelength. One advantage of calculating the reconstruction matrix row-by-row is that a different size windowing function can be applied for each wavelength. For example, due to intrinsic path delay inhomogeneities across an LCVR that might limit the best obtainable spectral resolution for shorter wavelengths, shorter wavelengths typically generate interferograms with most of their signal energy located around zero path delay. Therefore, when reconstructing the shorter wavelength portions of a spectrum from an interferogram, it is advantageous to first multiply the interferogram by a windowing function that includes just those portions where there is signal from shorter wavelengths. Making the window bigger would add more noise but not signal, as unlike the signal, the noise is often distributed across all path delays. And, to avoid repeating multiplications of the interferograms at different locations with the same window function(s), the window functions can be multiplied elementwise with the rows of the reconstruction matrix 500.

Figure 8:
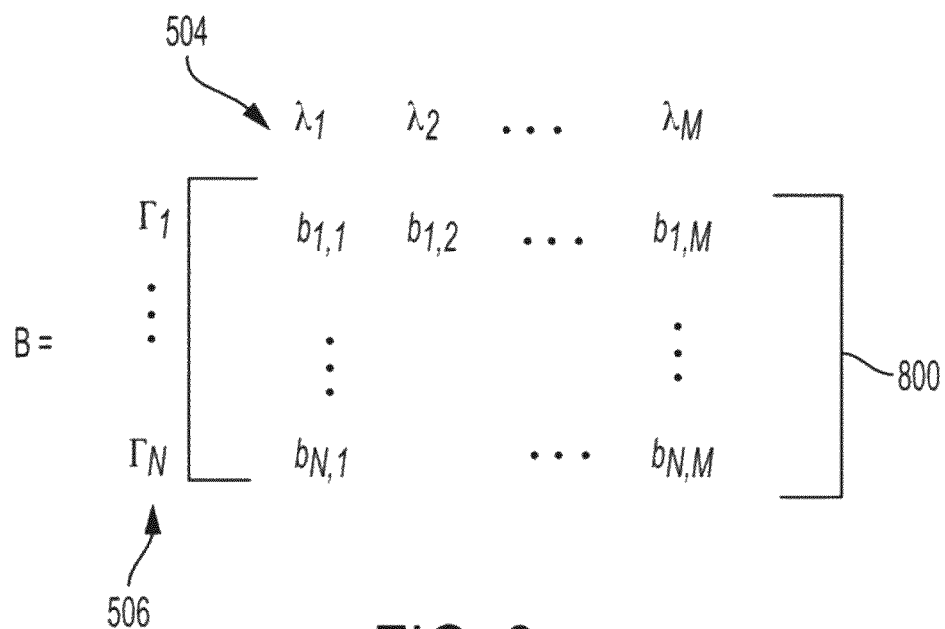
FIG. 8 is a diagram of a system response matrix according to an example embodiment.

If A is the reconstruction matrix 500 and B is a matrix with columns that are the system response at each wavelength represented by a row of the reconstruction matrix 500, then the reconstruction matrix 500 can be pre-multiplied by the diagonalization matrix $(AB)^{-1}$ in order to "diagonalize" the reconstruction. That is, the full reconstruction matrix could be set to $(AB)^{-1}$ A so that multiplication by the system response matrix B (or by the measured response at a given wavelength) produces the identity. This is analogous to a least-squares solution to the reconstruction of spectral data from interferograms. Also, because AB may be ill-conditioned, it may be necessary to provide some form of regularization to prevent the above matrix inversion from diverging. For example, one could add a multiple of the identity prior to inversion: $(AB+\beta I)^{-1}$, where I is the M×M identity matrix and $\beta$ is a multiplication factor. The reconstruction matrix 500 can also include information about the spectral sensitivity of the interferometer in order to equalize the system response across wavelengths. The diagram in FIG. 8 shows the system response matrix B 800. The columns of the matrix 800 are the expected raw interferograms generated by a unit wavelength stimulus to the interferometer at the wavelengths 504 corresponding to each of the rows of A.

Figure 9:
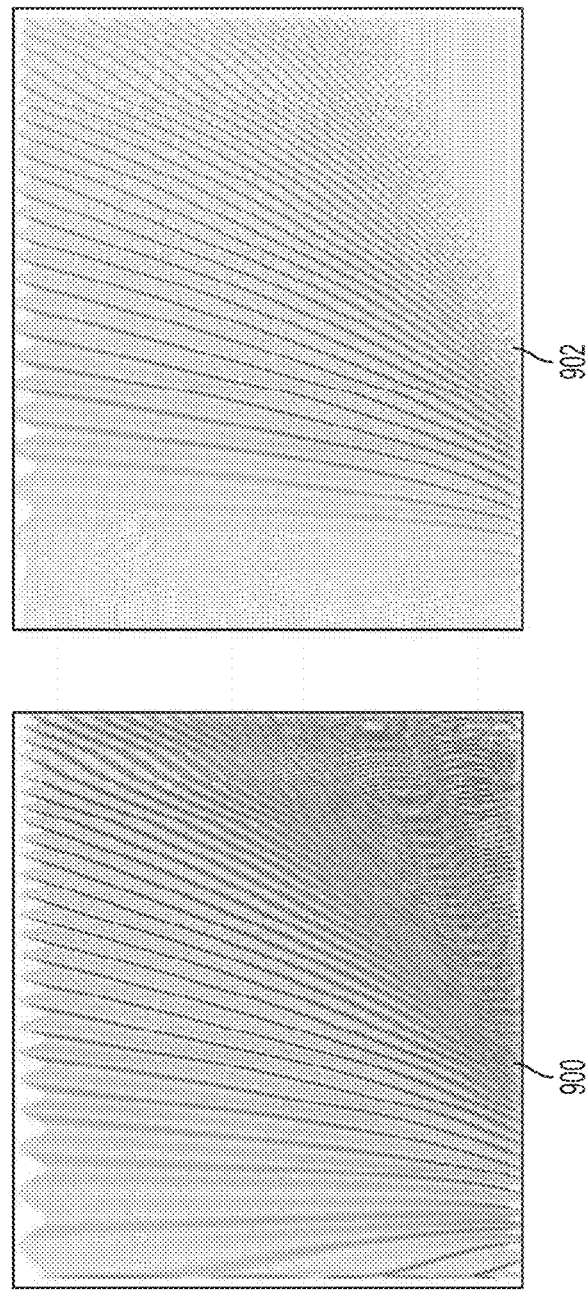
FIG. 9 is a set of plots showing the effect of ramp and window functions on a reconstruction matrix according to example embodiments.

In FIG. 9, a pair of stacked plots shows two reconstruction matrices as described above and plotted similarly to the measurements in FIG. 4. Each line of plot 900 is a row of the reconstruction matrix A as in Equation (2), accounting for non-uniform retardance spacing, wavelength-dependent zero path delay, and liquid-crystal dispersion. The plot 902 shows the effects of additional processing, which includes multiplication of each row by the ramp function of Equation (4) to avoid double-counting the symmetric part of the interferogram, as well as wavelength-dependent windowing to separately define the resolution bin size for each wavelength.

Figure 10:
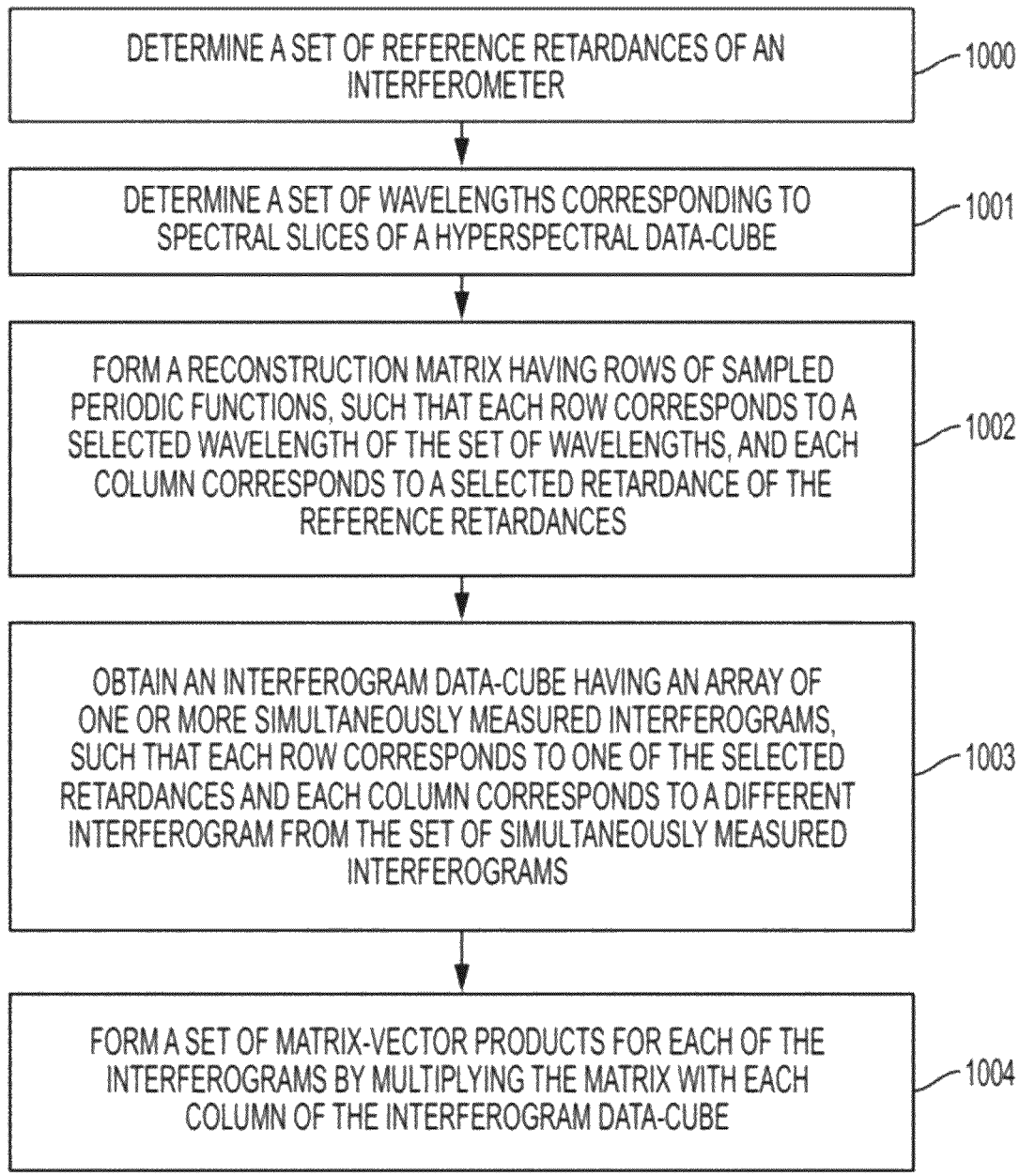
FIG. 10 is a flowchart of a method according to an example embodiment.

In FIG. 10, a flowchart shows a method according to an example embodiment. The method involves determining 1000 a set of reference retardances of an interferometer. A set of wavelengths corresponding to spectral slices of a hyperspectral data-cube are also determined 1001, e.g., based on a desired spectral range of the hyperspectral data-cube. A reconstruction matrix is formed 1002. The reconstruction matrix has rows of sampled periodic functions. Each row of the reconstruction matrix corresponds to a selected wavelength of the set of wavelengths, and each column of the reconstruction matrix corresponds to a selected retardance of the reference retardances. The periodic functions have as a parameter the selected wavelength of the corresponding row and are sampled at the reference retardances of each of the corresponding columns.

An interferogram data-cube is obtained 1003, e.g., via an optical detector. The interferogram data-cube includes an array of one or more simultaneously measured interferograms. The simultaneously measured interferograms may be non-uniformly sampled with respect to optical path delay. Each row of the interferogram data-cube corresponds to one of the selected retardances and each column of the interferogram data-cube corresponds to a different interferogram from the set of simultaneously measured interferograms. A set of matrix-vector products is formed 1004 for each of the interferograms. Each of the matrix-vector products includes a matrix multiplication of the reconstruction matrix with a column of the interferogram data-cube. The set of matrix-vector products forms the hyperspectral data-cube.

The various embodiments described above may be implemented using circuitry, firmware, and/or software modules that interact to provide particular results. One of skill in the relevant arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining a set of reference retardances of an interferometer;
   determining a set of wavelengths corresponding to spectral slices of a hyperspectral data-cube;
   forming a reconstruction matrix comprising rows of periodic functions, wherein each row of the reconstruction matrix corresponds to a selected wavelength of the set of wavelengths, and each column of the reconstruction matrix corresponds to a selected retardance of the reference retardances, wherein the periodic functions have as a parameter the selected wavelength of the corresponding row and are sampled at the selected retardance of each of the corresponding columns;

obtaining an interferogram data-cube comprising an array of one or more simultaneously measured interferograms, wherein each row of the interferogram data-cube corresponds to one of the selected retardances and each column of the interferogram data-cube corresponds to a different interferogram from the simultaneously measured interferograms; and forming a set of matrix-vector products for each of the interferograms, each of the matrix-vector products comprising a matrix multiplication of the reconstruction matrix with a column of the interferogram data-cube, the set of matrix-vector products forming the hyperspectral data-cube.

2. The method of claim 1, wherein the interferograms correspond to different image points within the interferometer.

3. The method of claim 1, wherein the simultaneously measured interferograms are non-uniformly sampled with respect to optical path delay.

4. The method of claim 1, wherein the interferometer comprises a polarization interferometer.

5. The method of claim 4, wherein the polarization interferometer comprises a liquid-crystal variable retarder, and wherein a relative rate of oscillation of the periodic functions in each row is based on a liquid-crystal birefringence of the liquid-crystal variable retarder as a function of at least one of wavelength and temperature.

6. The method of claim 1 wherein the calculation takes place on a graphics-processing unit.

7. The method of claim 1 wherein different matrices are constructed for at least two spatial regions of the interferometer.

8. The method of claim 1 wherein the periodic function is a sinusoidal function.

9. The method of claim 1 wherein each of the periodic functions is phase-shifted for each of the selected wavelengths so that a phase of 0 corresponds roughly to a zero-retardance point of the interferometer at each of the selected wavelengths.

10. The method of claim 9 wherein the phase shift depends on a temperature of the interferometer.

11. The method of claim 1, further comprising multiplying each row of the reconstruction matrix by a wavelength-dependent function to reduce artifacts caused by asymmetrically measured interferograms.

12. The method of claim 1, wherein each row of the reconstruction matrix is multiplied by a wavelength-dependent windowing or apodization function.

13. The method of claim 1, wherein each row of the reconstruction matrix is multiplied by the reciprocal of a sensitivity function at each selected wavelength.

14. The method of claim 1, wherein the reconstruction matrix is multiplied by a diagonalization matrix $(AB)^{-1}$ to yield $(AB)^{-1}A$, where A is the reconstruction matrix and B is a system response matrix with columns that are the expected raw interferograms generated by a unit wavelength stimulus to the interferometer at the wavelengths corresponding to each of the rows of A.

15. The method of claim 14, wherein a regularization technique is applied to prevent the diagonalization matrix from diverging.

16. An apparatus, comprising:

an interferometer operable to transition through a set of reference retardances;

an optical sensor operable to simultaneously measure interferograms corresponding to different positions of the optical sensor as the interferometer transitions through the set of the reference retardances; and a controller coupled to the interferometer and the optical sensor, the controller operable to:

determine a set of wavelengths corresponding to spectral slices of a hyperspectral data-cube;

form a reconstruction matrix comprising rows of periodic functions, wherein each row corresponds to a selected wavelength of the set of wavelengths, and each column corresponds to a selected retardance of the reference retardances, wherein the periodic functions each have as a parameter the selected wavelength of the corresponding row and are sampled at the selected retardance of the corresponding column;

obtain an interferogram data-cube comprising an array of one or more of the simultaneously measured interferograms, wherein each row of the interferogram data-cube corresponds to one of the selected retardances and each column of the interferogram data-cube corresponds to a different interferogram from the simultaneously measured interferograms; and form a set of matrix-vector products for each of the interferograms, each of the matrix-vector products comprising a matrix multiplication of the reconstruction matrix with a column of the interferogram data-cube, the set of matrix-vector products forming the hyperspectral data-cube.

17. The apparatus of claim 16, wherein each of the periodic functions is phase-shifted for each of the selected wavelengths so that a phase of 0 corresponds roughly to a zero-retardance point of the interferometer at each of the selected wavelengths.

18. The apparatus of claim 16, wherein the controller is further configured to multiply each row of the reconstruction matrix by a wavelength-dependent function to reduce artifacts caused by asymmetrically measured interferograms.

19. The apparatus of claim 16, wherein each row of the reconstruction matrix is multiplied by a wavelength-dependent windowing or apodization function.

20. The apparatus of claim 16, wherein the reconstruction matrix is multiplied by a diagonalization matrix $(AB)^{-1}$ to yield $(AB)^{-1}A$, where A is the reconstruction matrix and B is a system response matrix with columns that are the expected raw interferograms generated by a unit wavelength stimulus to the interferometer at the wavelengths corresponding to each of the rows of A.

* * * * *